US012706988B2

(12) United States Patent
Wang et al.

(10) Patent No.: US 12,706,988 B2
(45) Date of Patent: Aug. 11, 2026

(54) HIGH-SPEED PROTOCOL CONVERSION DEVICE AND PARALLEL PROCESSING UNIT FOR INDUSTRIAL HETEROGENEOUS NETWORKS

(71) Applicant: CHONGQING UNIVERSITY OF POSTS AND TELECOMMUNICATIONS, Chongqing (CN)

(72) Inventors: Heng Wang, Chongqing (CN); Xueda Huang, Chongqing (CN); Ping Wang, Chongqing (CN); Meixing Xu, Chongqing (CN); Anhua Deng, Chongqing (CN); Chuang Yang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 137 days.

(21) Appl. No.: 18/044,194

(22) PCT Filed: Mar. 23, 2022

(86) PCT No.: PCT/CN2022/082422

§ 371 (c)(1),
(2) Date: Mar. 20, 2025

(87) PCT Pub. No.: WO2022/237332

PCT Pub. Date: Nov. 17, 2022

(65) Prior Publication Data

US 2025/0227165 A1 Jul. 10, 2025

(30) Foreign Application Priority Data

May 10, 2021 (CN) ........................ 202110506224.X
May 17, 2021 (CN) ........................ 202110535853.5

(51) Int. Cl.
*H04L 69/08* (2022.01)

(52) U.S. Cl.
CPC .................................... *H04L 69/08* (2013.01)

(58) Field of Classification Search
CPC .......... H04L 69/08; H04L 67/12; H04L 69/18
(Continued)

(56) References Cited

U.S. PATENT DOCUMENTS 7,844,308 B2 * 11/2010 Rhee ..................... H04W 84/18 455/574
10,484,512 B2 * 11/2019 Pai .......................... H04W 4/70
(Continued)

FOREIGN PATENT DOCUMENTS

CN 104519554 A 4/2015
CN 110635933 A 12/2019

OTHER PUBLICATIONS

Notice of Grant of Patent Right of corresponding CN Application 202110535853.5, published on Feb. 23, 2022.
Grant claims of corresponding CN application 202110535853.5.

*Primary Examiner* — Jean A Gelin
(74) *Attorney, Agent, or Firm* — Westbridge IP LLC

(57) ABSTRACT

The present invention relates to a high-speed protocol conversion device and a parallel processing unit for industrial heterogeneous networks, and belongs to the technical field of industrial Internet. The device comprises a queue transceiver unit, a protocol conversion unit, a parallel processing unit and an SDN management interface unit; uses a wireless module to receive and transmit data of an industrial wireless network; and uses a network card to receive and transmit data of an industrial wired network and data of an IPv6 backbone network. The queue transceiver unit is used for classification management of data packets; the protocol conversion unit is used for completing protocol conversion between the industrial wireless network & the industrial
(Continued)

wired network and the IPv6 backbone network; the parallel processing unit is used for parallel processing of multi-protocol conversion; and the SDN management interface unit is used for realizing control the protocol conversion device by an upper-layer SDN controller. The present invention supports the protocol conversion between the industrial wireless network & the industrial wired network and the IPv6 backbone network, and uses technologies such as parallel processing and cache optimization to ensure parallel and high-speed processing of multi-protocol conversion and realize efficient interconnection of industrial heterogeneous networks.

6 Claims, 3 Drawing Sheets

(58) Field of Classification Search
USPC .......................................................... 370/329
See application file for complete search history.

(56) References Cited

U.S. PATENT DOCUMENTS

2001/0013070 A1* 8/2001 Sasaki .................. H04L 67/561 709/249
2004/0184479 A1* 9/2004 Yamauchi ............... H04L 69/08 370/466
2007/0124504 A1* 5/2007 McNealy .............. H04J 3/0638 709/248
2010/0128715 A1* 5/2010 Dei ..................... H04M 7/1205 370/352
2011/0274116 A1* 11/2011 Ozawa .................. H04M 7/123 370/401
2013/0132634 A1* 5/2013 Liu ..................... G06F 13/4022 710/308
2013/0293155 A1* 11/2013 Campbell ............ H04L 12/282 315/307
2013/0332504 A1* 12/2013 Nishioka ............ H04L 41/0846 709/201
2016/0188527 A1 6/2016 Cherian et al.
2017/0070362 A1* 3/2017 Tappeiner ........... H04L 12/2856
2018/0191873 A1* 7/2018 Bao ....................... H04L 69/324
2019/0036796 A1* 1/2019 Xu .......................... H04L 69/08
2020/0162588 A1 5/2020 Kucera et al.
2020/0201797 A1* 6/2020 Vu ........................ H04L 1/0041
2023/0199683 A1* 6/2023 Yu ............................ H04J 3/12 370/350

* cited by examiner

HIGH-SPEED PROTOCOL CONVERSION DEVICE AND PARALLEL PROCESSING UNIT FOR INDUSTRIAL HETEROGENEOUS NETWORKS

FIELD OF INVENTION

The present invention belongs to the technical field of industrial Internet, and relates to a high-speed protocol conversion device and a parallel processing unit for industrial heterogeneous networks.

BACKGROUND ART OF THE INVENTION

Industrial Internet and Industry 4.0 are important ways to realize digital transformation of manufacturing industry. Industrial networks are the bases of industrial Internet, and are generally comprised of industrial field networks and industrial backbone networks. The industrial field networks include industrial wireless networks and industrial wired networks, and are used for information collection and decision control in a production process. Mainstream industrial wireless networks include WIA-PA 6Tisch, etc., and the industrial wired networks are more diverse, with typical protocols including Profinet, EtherCAT, CIP, Modbus, etc. The industrial backbone networks are important hubs connecting industrial production fields and the Internet. With the development of the next generation Internet technology, application of IPv6 protocol to factory backbone networks has become an important development trend.

In order to meet the diversified needs of industrial production, industrial networks usually adopt heterogeneous networking modes, which are comprised of a mixture of various industrial wired and wireless networks. Heterogeneity has become a prominent feature of industrial networks. In a heterogeneous environment, a protocol conversion device is indispensable for device communication between different networks. In addition, control data in industrial networks needs low-latency transmission, and protocol conversion speed becomes a key factor restricting end-to-end cross-network control. Therefore, it is urgently needed to design a high-speed protocol conversion device for industrial heterogeneous networks that supports cross-network transmission.

Aiming at the above problems, the present invention designs a high-speed protocol conversion device for industrial heterogeneous networks, which can simultaneously support protocol conversion between different industrial wireless networks & industrial wired networks and IPv6 backbone networks. The device is also provided with a parallel processing unit, which accelerates protocol conversion through parallel design and optimization, and supports control by an SDN controller. Using the device and the parallel processing unit, interconnection between an industrial field network and an IPv6 backbone network can be realized effectively.

DISCLOSURE OF THE INVENTION

In view of this, the purpose of the present invention is to provide a high-speed protocol conversion device and a parallel processing unit for industrial heterogeneous networks, which can simultaneously support protocol conversion between different industrial wireless networks & industrial wired networks and IPv6 backbone networks. The device is also provided with a parallel processing unit, which accelerates protocol conversion through parallel design and optimization, and supports control by an SDN controller. Using the device and the parallel processing unit, interconnection between an industrial field network and an IPv6 backbone network can be realized effectively.

To achieve the above purpose, the present invention provides the following technical solution:

A high-speed protocol conversion device for industrial heterogeneous networks, which uses a queue transceiver unit, a protocol conversion unit, a parallel processing unit and an SDN management interface unit to ensure high-speed protocol conversion of a cross-network data flow in the device and realize interconnection between industrial heterogeneous networks.

The device specifically comprises: the queue transceiver unit, the protocol conversion unit, the parallel processing unit and the SDN (Software Defined Network) management interface unit; the queue transceiver unit is used for classification management of data packets; the protocol conversion unit is used for completing protocol conversion between an industrial wireless network & an industrial wired network and an IPv6 backbone network; the parallel processing unit is used for parallel and high-speed processing of multi-protocol conversion; and the SDN management interface unit is used for realizing control the protocol conversion device by an upper-layer SDN controller.

Further, the device uses a wireless module to receive and transmit data of an industrial wireless network; and uses a network card to receive and transmit data of the industrial wired network and data of the IPv6 backbone network.

Further, the device simultaneously supports conversion between the industrial wireless network & the industrial wired network and the IPv6 backbone network, is accessed to the industrial wireless network through the wireless module which is connected to a serial port of the device, and can be controlled to increase or decrease support for the industrial wireless network by inserting and removing the wireless module; each network interface has a same interface form and simultaneously supports the IPv6 backbone network and various industrial wired networks, data of various industrial wired networks can be converted to IPv6 protocol when arriving at a same network interface in succession, and the network interface supports multi-channel data stream simultaneous conversion and multi-protocol simultaneous conversion.

Further, after data arrives at the network card, a hash value is calculated by the queue transceiver unit through a hash function and a keyword in the data, different types of data is hashed to different network card queues by querying a queue correspondence table using the hash value, and the data is written to a buffer area according to an address in a queue descriptor; the data in a queue is read by an application program, protocol conversion to IPv6 is conducted after a protocol type is judged, and converted data is transmitted to a specified network card queue according to the original protocol type.

Further, the data in the buffer area is read by the protocol conversion unit according to a network card ID (Identifier) and a queue ID, data of the serial port is read according to a serial port descriptor, and a memory pool is created; the memory pool is bound to a structural body, protocol conversion of data of the industrial wired network and data of the industrial wireless network at the serial port are conducted, converted IPv6 data is written to the structural body after verification and calculation, a network card transmitting queue is specified, a transmit descriptor is pointed to the memory pool, an address pointed to by the transmit descriptor is read by the network card, and data transmitting is started.

Further, a multiprocessor and multithreading technology is used by the parallel processing unit, and different application programs are bound to a specific processor to collaboratively complete a protocol conversion task and support parallel processing of data when arriving at different interfaces and multiple types of data when arriving at a same interface; the specific steps are as follows:

- S1: conducing system initialization of the protocol conversion device, comprising operations such as scanning a network card device and the serial port, registering a drive program and conducting simple initialization of the device;
- S2: parsing command line arguments (including number of cores used, number of memory channels, port mask and other settings) of the application program, and conducting command line control of protocol conversion programs by the command line arguments;
- S3: checking number of network card receiving and transmitting queues and number of CPU cores;
- S4: getting number of network interfaces, allocating a memory pool for each network interface, and allocating the memory pool to the structural body through which the application program can get or transmit data;
- S5: setting and initializing the transmitting and receiving queues, and starting the network card device and the serial port after setting; setting the network card to a promiscuous mode to receive data packets of any protocol type, and checking link state (including information such as network connection state and Internet speed) of the network card;
- S6: creating protocol conversion threads, and binding a protocol conversion thread 1 to a slave core CPU1 by CPU affinity and a thread binding function;
- S7: periodically polling the network card device and the serial port by the application program to see if descriptors thereon are set to 1, receiving data by the network card or the serial port if the descriptors are set to 1, and reading the data; judging protocol type of the data, and conducting protocol conversion if the protocol type is a protocol conversion type specified by a protocol conversion program 1;
- S8: binding a protocol conversion thread 2 to a slave core CPU2 by the same method as in steps S6 and S7, and conducting protocol conversion through corresponding programs; and
- S9: waiting for an external or internal signal by a main core CPU, turning off the network card device and the serial port when the signal arrives, and thus completing parallel protocol conversion.

Further, HugePages is set when the application program is started, and a cache size is specified when the memory pool is created by the protocol conversion unit; an IPv6 data packet HugePages buffer area is preallocated to the protocol conversion unit, and a corresponding head pointer is initialized; data of the network card is read by a data packet queue prefetching technology, and at the same time, a code is realized by a macro programming technology.

The present invention has the following beneficial effects:

1) The present invention uses the wireless module and the network card to connect the industrial wireless network and the industrial wired network, various different industrial wireless networks can be supported by increasing or decreasing industrial wireless modules, each network interface uses the same interface form to support various industrial wired networks, and the network interface supports multi-channel data stream simultaneous conversion and multi-protocol simultaneous conversion.
2) The present invention uses the multiprocessor and multithreading technology to bind different threads to different CPU cores, which ensures that a protocol conversion task runs on a fixed core, reduces task switching on a same core, and thus increases protocol conversion efficiency.
3) The present invention uses the technologies such as HugePages, cache, data packet queue prefetching and macro programming to improve the hit ratio of data cache on a CPU core and reduce the time cost caused by a function call, so as to guarantee the high-speed operation of protocol conversion.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Referring to FIGS. 1-4, FIG. 1 is an overall architecture diagram of a high-speed protocol conversion device and a parallel processing unit for industrial heterogeneous networks, comprising a queue transceiver unit, a protocol conversion unit, a parallel processing unit and an SDN management interface unit; the device uses a wireless module to receive and transmit data of an industrial wireless network; and uses a network card to receive and transmit data of the industrial wired network and data of the IPv6 backbone network. The queue transceiver unit is used for classification management of data packets. The protocol conversion unit is used for completing protocol conversion between the industrial wireless network & the industrial wired network and the IPv6 backbone network. The parallel processing unit is used for parallel and high-speed processing of multi-protocol conversion. The SDN management interface unit is used for realizing control the protocol conversion device by an upper-layer SDN controller.

The protocol conversion device and the parallel processing unit simultaneously supports conversion between the industrial wireless network & the industrial wired network and IPv6 protocol, is accessed to the industrial wireless network through the wireless module which is connected to a serial port of the device, and can be controlled to increase or decrease support for the industrial wireless network by inserting and removing the wireless module; each network interface has a same interface form and simultaneously supports the IPv6 backbone network and various industrial wired networks, data of various industrial wired networks can be converted to IPv6 protocol when arriving at a same network interface in succession, and the network interface supports multi-channel data stream simultaneous conversion and multi-protocol simultaneous conversion.

Figure 1:
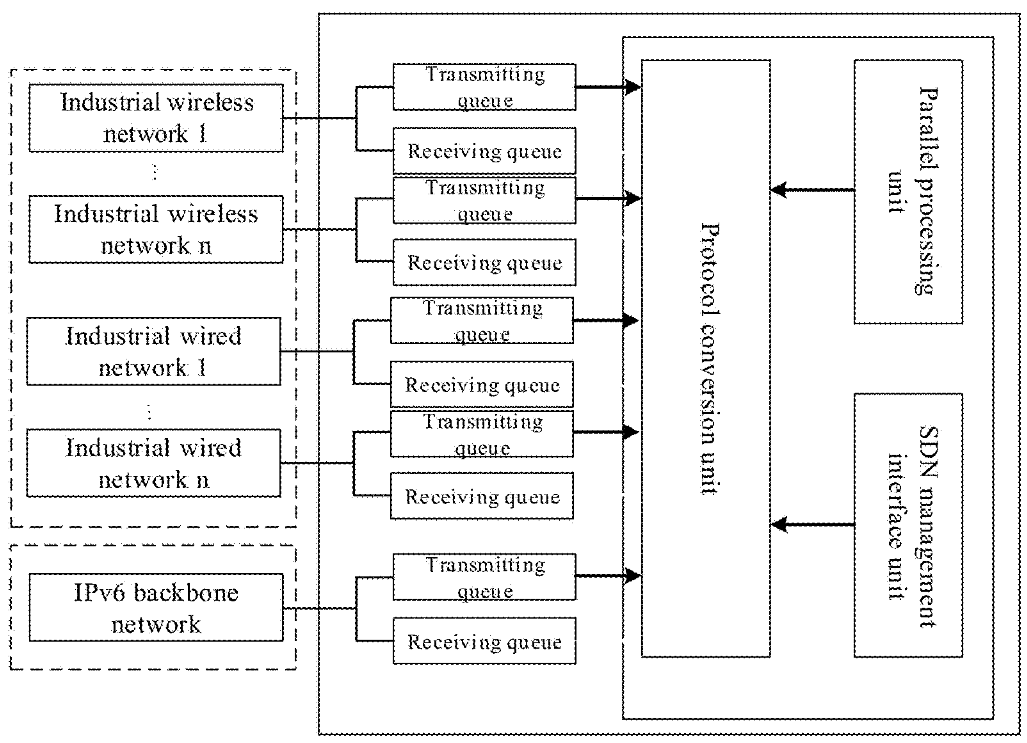
FIG. 1 is an overall architecture diagram of a high-speed protocol conversion device and a parallel processing unit for industrial heterogeneous networks in the present invention.
Figure 2:
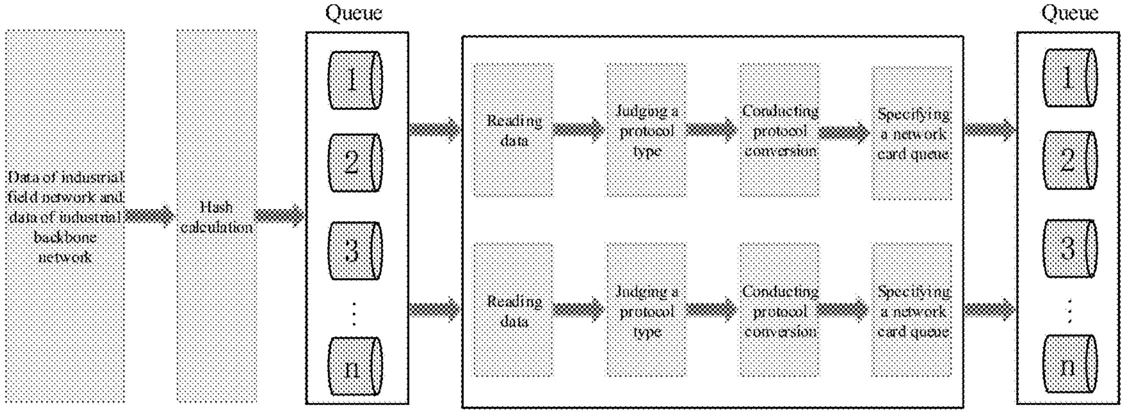
FIG. 2 is a receiving and transmitting flow chart of a network card in the present invention.

FIG. 2 is a receiving and transmitting flow chart of a network card. As shown in FIG. 2, after data arrives at the network card, a hash value is calculated by the queue transceiver unit through a hash function and a keyword in the data, different types of data is hashed to different network card queues by querying a queue correspondence table using the hash value, and the data is written to a buffer area according to an address in a queue descriptor. The data in a queue is read by an application program, protocol conversion to IPv6 is conducted after a protocol type is judged, and converted data is transmitted to a specified network card queue according to the protocol type.

Figure 3:
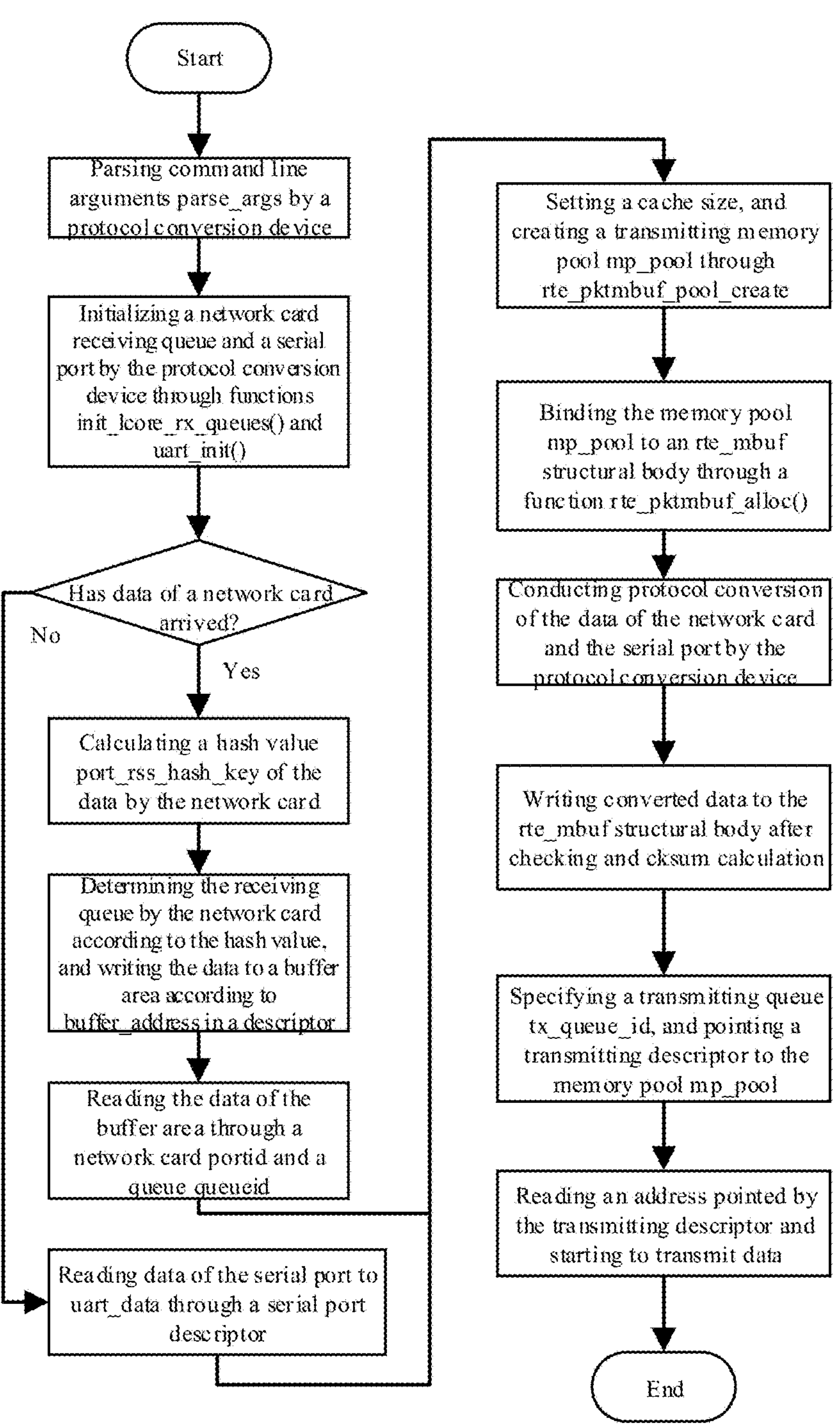
FIG. 3 is a data processing flow chart of a protocol conversion unit in the present invention.

FIG. 3 is a data processing flow chart of a protocol conversion unit. As shown in FIG. 3, the data in the buffer area is read by the protocol conversion unit according to a network card ID and a queue ID, data of the serial port is read according to a serial port descriptor, and a memory pool is created; the memory pool is bound to a structural body, protocol conversion of data of the industrial wired network and data of the industrial wireless network at the serial port are conducted, converted IPv6 data is written to the structural body after verification and calculation, a network card transmitting queue is specified, a transmit descriptor is pointed to the memory pool, an address pointed to by the transmit descriptor is read by the network card, and data transmitting is started.

Figure 4:
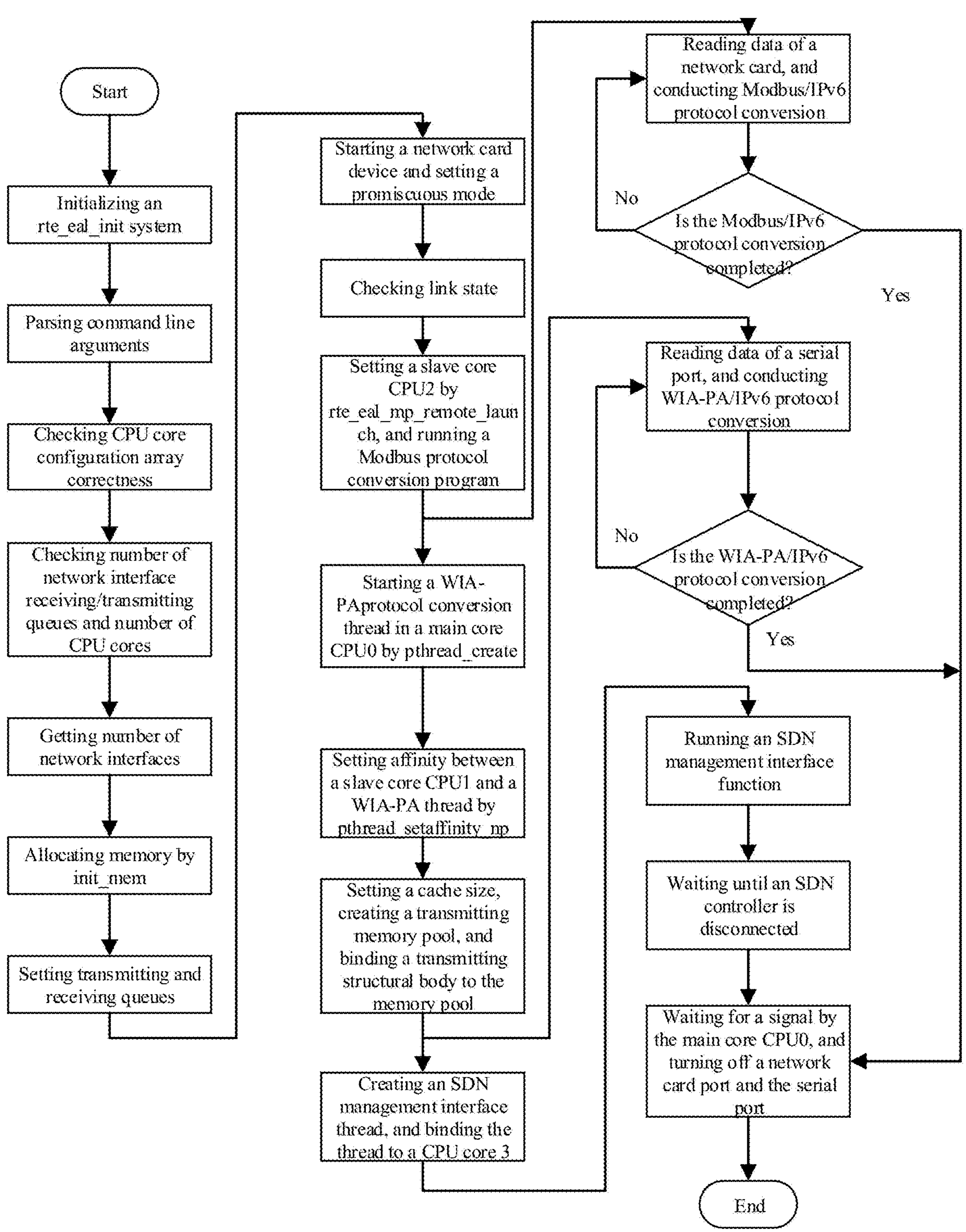
FIG. 4 is a parallel processing flow chart of the present invention.

FIG. 4 is a parallel processing flow chart. As shown in FIG. 4, a multiprocessor and multithreading technology is used by the parallel processing unit, and different application programs are bound to a specific processor to collaboratively complete a protocol conversion task. Three tasks, i.e., conversion between industrial wireless network WIA-PA and IPv6 protocol, conversion between industrial Ethernet Modbus and IPv6 protocol, and an SDN management interface, are taken as examples and implemented by the parallel processing unit; the specific steps are as follows:

- S1: conducing system initialization by a function rte_eal_init( ), comprising operations such as scanning a network interface device and the serial port, registering a drive program and conducting simple initialization of the device;
- S2: parsing command line arguments (including number of cores used, number of memory channels, port mask and other settings) of the application program, and conducting command line control of protocol conversion programs by the command line arguments;
- S3: checking accuracy of a pre-configured array of CPU cores, number of network interface receiving and transmitting queues and number of CPU cores;
- S4: getting number of network interfaces, allocating a memory pool for each port by a function init_mem( ), and allocating the memory pool to an mbuf structural body through which the application program can get or transmit data of the network card;
- S5: setting and initializing the transmitting and receiving queues, and starting the network card device after setting; setting the network card to a promiscuous mode to receive data packets of any protocol type, and checking link state (including information such as network connection state and Internet speed) of the network card;
- S6: binding a Modbus and IPv6 protocol conversion program to a slave core CPU2 by a function rte_eal_mp_remote_launch( );
- S7: periodically polling the network card device by the application program to see if a descriptor thereon is set to 1, receiving data by the network card if the descriptor is set to 1, and reading the data; judging in the Modbus and IPv6 protocol conversion program to see if the data is Modbus data, and conducting protocol conversion according to a designed Modbus and IPv6 protocol conversion process if the data is Modbus data;
- S8: during Modbus and IPv6 protocol conversion, creating a WIA-PA/IPv6 protocol conversion thread in a main core CPU0 through a Linux function pthread_create( ) because the Modbus and IPv6 protocol conversion program is bound to run on CPU2;
- S9: setting affinity between a slave core CPU1 and a WIA-PA thread by the application program through a Linux function pthread_setaffinity_np( ), and binding the thread to CPU1;
- S10: setting a cache size in a WIA-PA and IPv6 protocol conversion thread to improve data access efficiency; creating a transmitting memory pool, and binding the mbuf structural body to the memory pool;
- S11: reading data on the serial port, judging whether the data is WIA-PA data, and starting WIA-PA and IPv6 protocol conversion if the data is WIA-PA data;
- S12: creating an SDN management interface thread, and binding the thread to a slave core CPU3 in the same way for binding the WIA-PA thread;
- S13: running an SDN management interface function, and waiting until the SDN controller is disconnected or the running of the SDN management interface function is completed;
- S14: after the Modbus and IPv6 protocol conversion and the WIA-PA and IPv6 protocol conversion are completed, ending corresponding protocol conversion threads, completing the running of the SDN management interface function, waiting for an external or internal signal by the main core CPU0, and closing the network card device and the serial port when the signal arrives. Thus parallel protocol conversion between Modbus and IPv6 and between WIA-PA and IPv6 is completed.

HugePages is set when the application program is started, and a cache size is specified when the memory pool is created by the protocol conversion unit; an IPv6 data packet HugePages buffer area is preallocated to the protocol conversion unit, and a corresponding head pointer is initialized;

data of the network card is read by a data packet queue prefetching technology, and at the same time, a code is realized by a macro programming technology.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A high-speed protocol conversion device for industrial heterogeneous networks, comprising: a queue transceiver unit, a protocol conversion unit, a parallel processing unit and an SDN (software defined network) management interface unit;

the queue transceiver unit is used for classification management of data packets;

the protocol conversion unit is used for completing protocol conversion between an industrial wireless network & an industrial wired network and an IPv6 backbone network;

the parallel processing unit is used for parallel and high-speed processing of multi-protocol conversion; and the SDN management interface unit is used for realizing control the protocol conversion device by an upper-layer SDN controller;

a multiprocessor and multithreading technology is used by the parallel processing unit, and different application programs are bound to a specific processor to collaboratively complete a protocol conversion task and support parallel processing of data when arriving at different interfaces and multiple types of data when arriving at a same interface; the specific steps are as follows:

S1: conducing system initialization of the protocol conversion device, comprising scanning a network card device and the serial port, registering a drive program and conducting simple initialization of the device;

S2: parsing command line arguments (including number of cores used, number of memory channels, port mask and other settings) of the application program, and conducting command line control of protocol conversion programs by the command line arguments;

S3: checking number of network card receiving and transmitting queues and number of CPU cores;

S4: getting number of network interfaces, allocating a memory pool for each network interface, and allocating the memory pool to the structural body through which the application program gets or transmits data;

S5: setting and initializing the transmitting and receiving queues, and starting the network card device and the serial port after setting; setting the network card to a promiscuous mode to receive data packets of any protocol type, and checking link state (including network connection state and Internet speed) of the network card;

S6: creating protocol conversion threads, and binding a protocol conversion thread 1 to a slave core CPU1 by CPU affinity and a thread binding function;

S7: periodically polling the network card device and the serial port by the application program to see if descriptors thereon are set to 1, receiving data by the network card or the serial port if the descriptors are set to 1, and reading the data judging protocol type of the data, and conducting protocol conversion if the protocol type is a protocol conversion type specified by a protocol conversion program 1;

S8: binding a protocol conversion thread 2 to a slave core CPU2 by the same method as in steps S6 and S7, and conducting protocol conversion through corresponding programs; and S9: waiting for an external or internal signal by a main core CPU, turning off the network card device and the serial port when the signal arrives, and thus completing parallel protocol conversion.

2. The high-speed protocol conversion device for industrial heterogeneous networks as claimed in claim 1, characterized in that the device uses a wireless module to receive and transmit data of the industrial wireless network; and uses a network card to receive and transmit data of the industrial wired network and data of the IPv6 backbone network.

3. The high-speed protocol conversion device for industrial heterogeneous networks as claimed in claim 1, characterized in that the device simultaneously supports conversion between the industrial wireless network & the industrial wired network and the IPv6 backbone network, is accessed to the industrial wireless network through the wireless module which is connected to a serial port of the device, and is controlled to increase or decrease support for the industrial wireless network by inserting and removing the wireless module; each network interface has a same interface form and simultaneously supports the IPv6 backbone network and various industrial wired networks, data of various industrial wired networks are converted to IPv6 protocol when arriving at a same network interface in succession, and the network interface supports multi-channel data stream simultaneous conversion and multi-protocol simultaneous conversion.

4. The high-speed protocol conversion device for industrial heterogeneous networks as claimed in claim 1, characterized in that after data arrives at the network card, a hash value is calculated by the queue transceiver unit through a hash function and a keyword in the data, different types of data is hashed to different network card queues by querying a queue correspondence table using the hash value, and the data is written to a buffer area according to an address in a queue descriptor; the data in a queue is read by an application program, protocol conversion to IPv6 is conducted after a protocol type is judged, and converted data is transmitted to a specified network card queue according to the original protocol type.

5. The high-speed protocol conversion device for industrial heterogeneous networks as claimed in claim 1, characterized in that the data in the buffer area is read by the protocol conversion unit according to a network card ID and a queue ID, data of the serial port is read according to a serial port descriptor, and a memory pool is created; the memory pool is bound to a structural body, protocol conversion of data of the industrial wired network and data of the industrial wireless network at the serial port are conducted, converted IPv6 data is written to the structural body after verification and calculation, a network card transmitting queue is specified, a transmit descriptor is pointed to the memory pool, an address pointed to by the transmit descriptor is read by the network card, and data transmitting is started.

6. The high-speed protocol conversion device for industrial heterogeneous networks as claimed in claim 1, characterized in that HugePages is set when the application program is started, and a cache size is specified when the memory pool is created by the protocol conversion unit; an IPv6 data packet HugePages buffer area is preallocated to the protocol conversion unit, and a corresponding head pointer is initialized; data of the network card is read by a data packet queue prefetching technology, and at the same time, a code is realized by a macro programming technology.

* * * * *